(12) United States Patent
Dunlop et al.

(10) Patent No.: US 12,020,030 B2
(45) Date of Patent: *Jun. 25, 2024

(54) COMMAND DELAY

(71) Applicant: Micron Technology, Inc., Boise, ID (US)

(72) Inventors: Bruce Dunlop, Bloomington, MN (US); Gary J. Lucas, Somerset, WI (US); Edward C. McGlaughlin, Minneapolis, MN (US)

(73) Assignee: Micron Technology, Inc., Boise, ID (US)

(*) Notice: Subject to any disclaimer, the term of this patent is extended or adjusted under 35 U.S.C. 154(b) by 114 days.

This patent is subject to a terminal disclaimer.

(21) Appl. No.: 17/403,079

(22) Filed: Aug. 16, 2021

(65) Prior Publication Data

US 2021/0373887 A1 Dec. 2, 2021

Related U.S. Application Data

(63) Continuation of application No. 16/554,332, filed on Aug. 28, 2019, now Pat. No. 11,093,244.

(51) Int. Cl.
G06F 9/30 (2018.01)
G06F 9/38 (2018.01)
G06F 9/48 (2006.01)
G06F 16/903 (2019.01)

(52) U.S. Cl.
CPC .......... G06F 9/3004 (2013.01); G06F 9/3836 (2013.01); G06F 9/4881 (2013.01); G06F 16/90339 (2019.01)

(58) Field of Classification Search
CPC ............ G06F 16/90339; G06F 9/3836; G06F 9/4881; G06F 9/3004
USPC ......................................................... 711/108
See application file for complete search history.

(56) References Cited

U.S. PATENT DOCUMENTS

| 5,768,325 | A | 6/1998 | Yamamoto |
| 8,316,219 | B2 | 11/2012 | Bellows et al. |
| 8,332,543 | B2 | 12/2012 | Lee et al. |
| 8,396,994 | B1 | 3/2013 | Lee et al. |
| 9,021,146 | B2 | 4/2015 | Ross et al. |
| 2006/0143373 | A1* | 6/2006 | Jain ......................... H04L 49/90 711/108 |

(Continued)

Primary Examiner — Gautam Sain
(74) Attorney, Agent, or Firm — Brooks, Cameron & Huebsch, PLLC

(57) ABSTRACT

An apparatus includes a memory component, a delay component, and a command component coupled to the delay component. The command component can be configured to enter a received command associated with accessing a physical address in the memory component into an execution queue and mark the command as active. The command component can be configured to send the active command to the memory component to be executed. The command component can be configured to clear the active command from the execution queue in response to receiving a message from the memory component, via the delay component, indicating the active command has been executed. The delay component can be configured to delay the message from the memory component a particular period of time before sending the message to the command component.

18 Claims, 9 Drawing Sheets

(56) References Cited

U.S. PATENT DOCUMENTS

| | | | | |
|---|---|---|---|---|
| 2010/0329050 A1* | 12/2010 | Kim | .................... | G11C 7/1096 |
| | | | | 365/189.08 |
| 2013/0117603 A1* | 5/2013 | Jess | .................... | G06F 11/1443 |
| | | | | 714/E11.041 |
| 2013/0151741 A1* | 6/2013 | Walker | ................ | G06F 13/1668 |
| | | | | 710/110 |
| 2013/0155765 A1* | 6/2013 | Yon | ..................... | G11C 13/004 |
| | | | | 365/163 |
| 2013/0298034 A1* | 11/2013 | Ramachandran | ....... | G06F 9/451 |
| | | | | 715/835 |
| 2015/0355843 A1* | 12/2015 | Palmer | ................. | G06F 3/0604 |
| | | | | 711/154 |
| 2017/0352403 A1* | 12/2017 | Lee | ..................... | G11C 14/009 |
| 2018/0341410 A1 | 11/2018 | Benisty | | |
| 2020/0192581 A1* | 6/2020 | Jung | .................... | G06F 3/0655 |

* cited by examiner

COMMAND DELAY

PRIORITY INFORMATION

This application is a Continuation of U.S. application Ser. No. 16/554,332, filed on Aug. 28, 2019, the contents of which are incorporated herein by reference.

TECHNICAL FIELD

Embodiments of the disclosure relate generally to memory sub-systems, and more specifically, relate to command delay.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

BRIEF DESCRIPTION OF THE DRAWINGS

Figure 1:
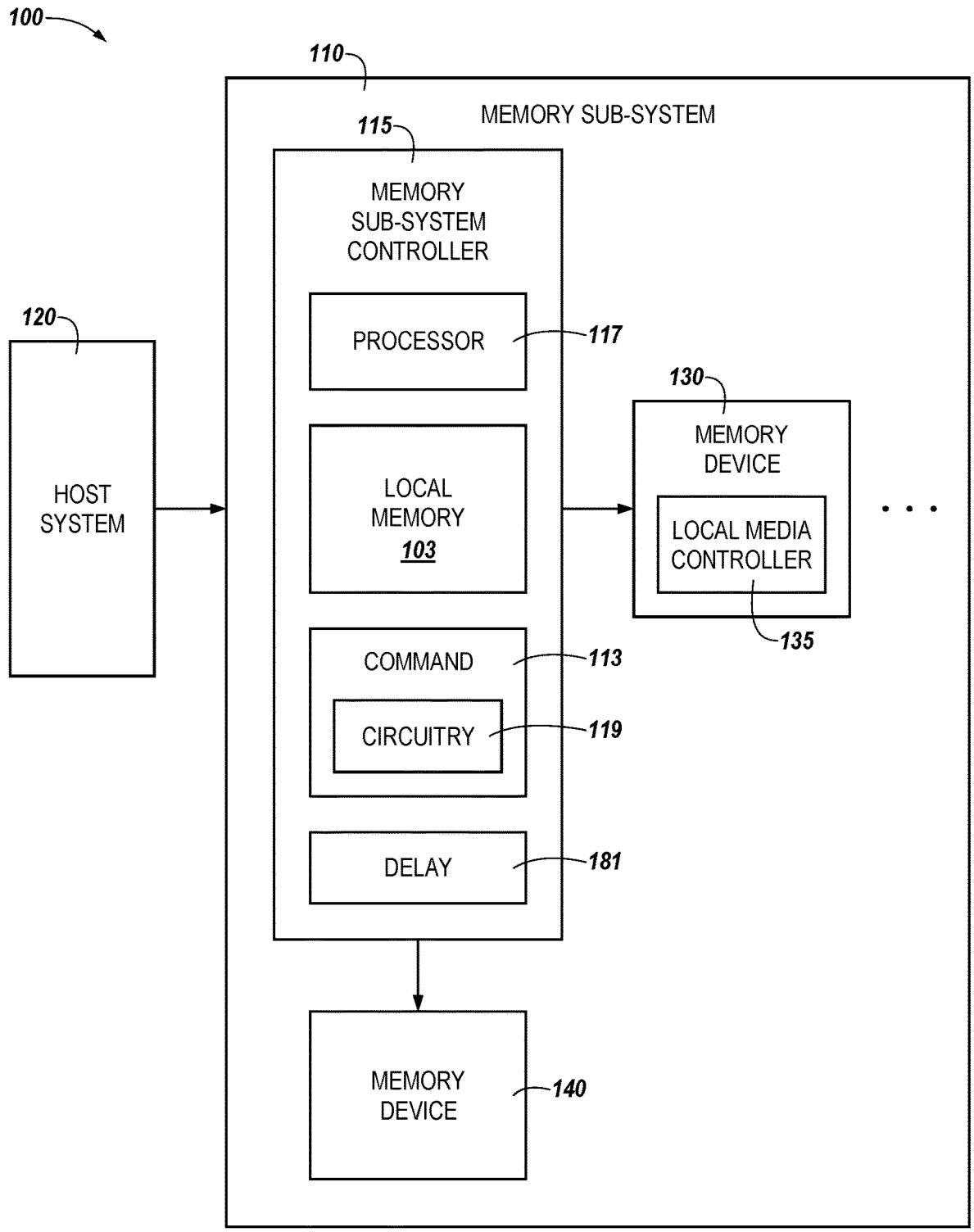
FIG. 1 illustrates an example computing environment that includes a memory sub-system in accordance with some embodiments of the present disclosure.

Aspects of the present disclosure are directed to memory sub-systems that include command delay. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

The memory components can include non-volatile memory devices that store data from the host system. A non-volatile memory device is a package of one or more dice. The dice in the packages can be assigned to one or more channels for communicating with a memory sub-system controller. The non-volatile memory devices include cells (i.e., electronic circuits that store information), that are grouped into pages to store bits of data. The non-volatile memory devices can include three-dimensional cross-point ("3D cross-point") memory devices that are a cross-point array of non-volatile memory that can perform bit storage based on a change of bulk resistance, in conjunction with a stackable cross-gridded data access array. Such non-volatile memory devices can group pages across dice and channels to form management units (MUs). A MU can include user data and corresponding metadata. A memory sub-system controller can send and receive user data and corresponding metadata as management units to and from memory devices. Another example of a non-volatile memory device is a negative-and (NAND) memory device. With NAND type memory, pages can be grouped to form blocks. Other examples of non-volatile memory devices are described below in conjunction with FIG. 1.

The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data.

The memory sub-system can map the logical address information to a physical address (e.g., physical MU address, physical block address) associated with one or more memory devices on the memory sub-system, and write host data to and/or read host data from the physical address. Memory sub-systems (e.g., SSDs) can include a compute component which can track commands and/or prevent access to physical addresses associated with a memory device. In some conventional approaches, access to particular physical address locations may not be tracked and the order of the accesses can overlap or be too close in time, resulting in incorrect data being accessed and incorrect data being stored back to the memory device(s).

Aspects of the present disclosure address the above and other deficiencies by introducing a delay in the access of a same physical access in memory by a subsequent command. More specifically, in order to execute a subsequent command associated with a physical address, a previously received command associated with the physical address is cleared from the command component. The clearing of a tracked command that has been executed can be intentionally delayed, prolonging the blockage of the associated physical address from being accessed by subsequent commands. This introduced delay after execution of a command can prevent overlap of multiple accesses or prevent multiple accesses that are too close in time and avoid errors in data.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, a vehicle (e.g., airplane, drone, train, automobile, or other conveyance), internet-of-things enabled device, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory devices such as 3D cross-point type and NAND type memory are described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages or codewords that can refer to a logical unit of the memory device used to store data. With some types of memory (e.g., NAND), pages can be grouped to form blocks. Some types of memory, such as 3D cross-point, can group pages across dice and channels to form management units (MUs).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 103. In the illustrated example, the local memory 103 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 103 can include memory registers storing memory pointers, fetched data, etc. The local memory 103 can also include read-only memory (ROM) for storing micro-code, for example. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include a local media controller 135 that operates in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system controller 115 includes a command component 113 that can be configured to track physical addresses of memory associated with command instructions for execution. The command component 113 can enter a command and its associated physical address into an execution queue and indicate in the entry whether the command is active (indicating the associated command is being sent to the memory component for execution), pending (indicating that the associated command is waiting in the execution queue until permission is granted or the command is allowed to be sent on for execution), and/or clear the command entry from the execution queue upon completion of the associated command. The indications can include setting a bit, setting a flag, or another indicator that can be referenced. As shown in FIG. 1, the command component 113 can include various circuitry 119 to facilitate the tracking of commands and their associated physical addresses associated with the commands. As an example, the circuitry 119 can include a special purpose circuitry in the form of an ASIC, FPGA, state machine, and/or other logic circuitry that can allow the command component 113 to track and/or monitor commands and corresponding physical addresses.

In one embodiment, the command component 113 includes a content-addressable memory (CAM) component. In a CAM, search data can be compared against a table of stored data whereby an address of matching data can be returned. In this case, entries in the CAM can be searched with a "hit" indicating that a command to a particular address already exists in the CAM (e.g., the physical address to which an incoming command is directed matches a physical address of a command already in the CAM) and a "miss" indicating that a command to the particular address does not already exist in the CAM (e.g., the physical address to which an incoming command is directed does not match a physical address of a command already in the CAM). As described further herein, in various embodiments, a CAM miss results in the incoming command being marked as "active" (e.g., ready for sending to the memory component for execution), and a CAM hit results in the incoming command being marked as "pending" and a delay being introduced to prevent the status of the pending command from being changed to active until a particular time period after the prior active command to the same address is complete.

The memory sub-system controller 115 can include a delay component 181. In some embodiments, the delay component 181 is a first-in-first-out (FIFO) buffer. The delay component 181 can receive data from the memory device 140 and can delay the data from being transferred to the command component 113 for a particular period of time. In some embodiments, the data can be delayed longer in response to data associated with a write command than in response to data associated with a read command. For example, in response to the memory device 140 sending a message or response indicating that a write command has been completed in the memory device 140, the delay component 181 can delay the message or response longer than if a read command was completed. In some embodiments, a message or response indicating a read command has been executed can bypass the delay component 181 altogether and be transferred directly to the command component 113, as will be described further below.

As described in more detail in connection with FIG. 2, the data can be transferred to the command circuitry 119 prior to execution of multiple commands in order to verify that a physical address location in memory is not being targeted by another command. For example, the command circuitry 119 can be used to track and/or monitor execution of the multiple commands by maintaining a list of received commands and whether the commands are pending or active, and can clear a command entry when that command has been executed. In contrast to approaches in which execution of a command is not blocked even though another command that is associated with the same physical address may not have completed execution, the blocking of access to a physical address, as is described below, can be used to prevent overlap of more than one command associated with a same physical address prior to completion of execution of at least one of the commands. Therefore, only one command to a particular physical address is executed at a time, with a next pending command being held (or blocked) until a response from the memory returns a command ID associated with a command that has bene executed at the particular physical address.

In some previous approaches, as an example, a host 120 may access a physical location in memory 140 and firmware (e.g., of a controller) may make a subsequent request to access memory so close in time that the access by the host 120 is either still occurring or has just occurred and the memory may have some lagging effects from the access that may affect the access of the firmware. Likewise, the host 120 may access the memory 140 and be storing intermediate results of processing back to the memory while the firmware is intending to access the result of the processing by the host even though the processing has not finalized. These scenarios can result in errors in data and intermediate results being treated as finalized results. As an example, a host 120 can be accessing data to perform a number of read operations, write operations, analytical operations, etc. on the data and the finalized data for such operations can be in error due to overlapping data access. As an example, firmware can be accessing the data to refresh the data, perform a number of clock cycles operations, etc. and be expecting to refresh or perform operations on finalized data.

As is described below, in order to avoid overlapping access to the same data at a same physical location in memory, a command and its associated address can be tracked and subsequent attempts to access the same physical address can be blocked if the initial access has not completed. In addition, attempts to access the same physical access can be delayed beyond completion of a prior command. For example, a host can request access to a particular physical address to execute a command (such as a write operation of data stored in the first physical address). A command component can track the particular physical address in an execution queue and mark the command entry associated with that particular physical address as "active." An active designation can indicate that a request to access data at the particular physical address has been received and sent on to a memory component where the data is stored. Once the command has been executed on the data at the particular physical address, a response indicating that the command has been executed can be delayed before being sent to the command component and removal of the "active" status of the command entry associated with the particular physical address can be delayed and/or removal of the command entry from the execution queue can be delayed. Subsequent requests to access data at the particular physical address can then be allowed once the delay has completed.

If a subsequent request to access data at the particular physical address is received at the command component while the command entry of the first request is still "active," the command component can compare the physical address of the subsequent request to physical addresses in the execution queue (which would result in a match of the physical address of the subsequent request and the particular physical address of the initial request). Since there is already an "active" status for a command at that physical address, the subsequent request can be marked as "pending," can be entered into the execution queue, and is linked with the previous command entry associated with the particular physical address entry. The response indicating that the initial command has been executed can be sent to a delay component (e.g., a FIFO component) and once a particular period of time, referred to as the delay, has completed, the initial command entry can be cleared from the execution queue and the subsequent command entry (due to the link in the execution queue) can be sent to the memory component for execution. After each execution of a command, the execution queue can be searched for a link to a subsequent command entry to be executed (which would include any requests to execute a command associated with a same physical address that has been received while an already received command instruction is being processed first).

In this way, while commands are listed as "pending" and waiting for previously received commands to be executed, commands that are subsequently received but associated with a different physical address in the memory component can be executed until a next linked command is allowed to be executed. The ordering of the command executions can be time-based until a physical address matches, in which case the timing can be reordered based on confirmation of executions of commands associated with the same physical addresses, as described above.

Figure 2:
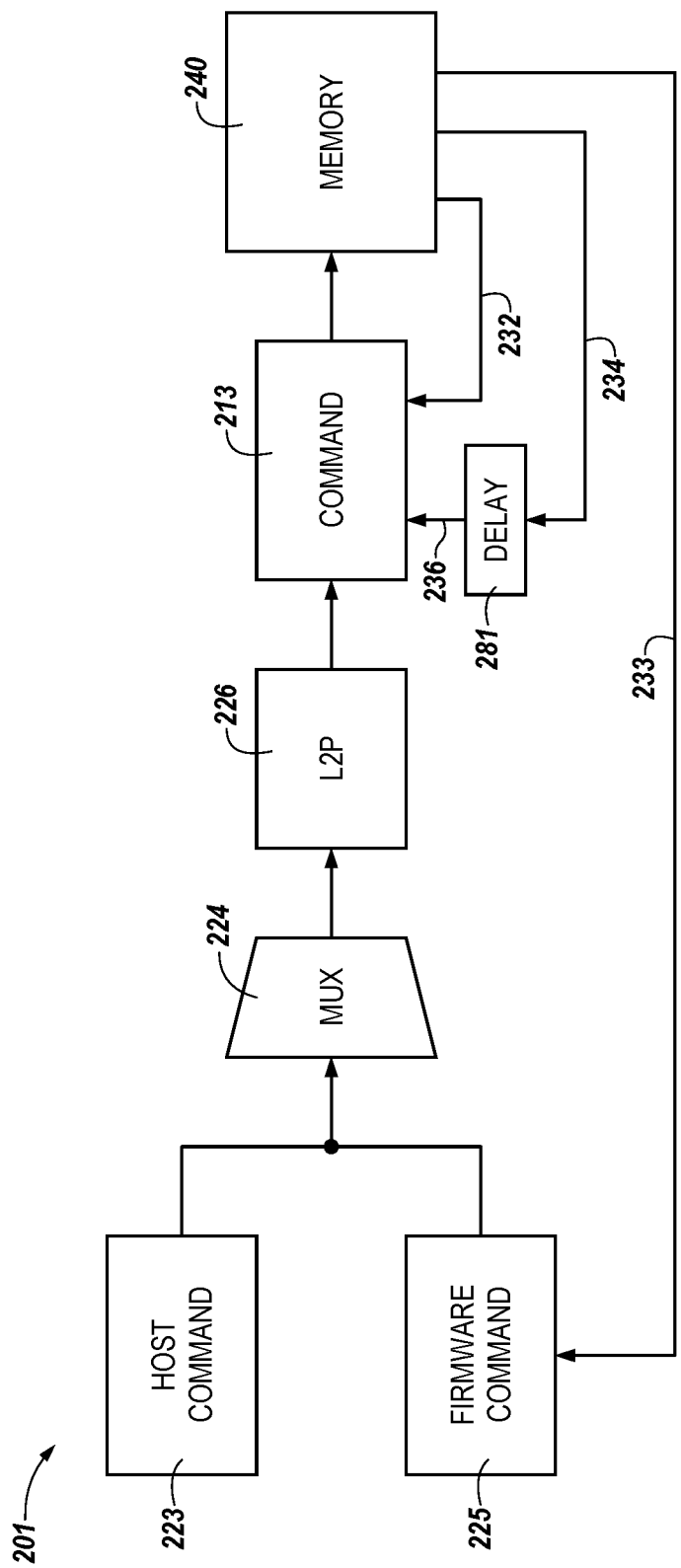
FIG. 2 illustrates an example of a command pipeline associated with command tracking in accordance with some embodiments of the present disclosure.

FIG. 2 illustrates an example of a command pipeline 201 associated with command tracking in accordance with some embodiments of the present disclosure. The pipeline 201 can include media, such as memory device 240 (e.g., a memory component), which can be analogous to the memory device 140 illustrated in FIG. 1. In addition, the command pipeline 201 can include a command component 213, which can be analogous to the command component 113 illustrated in FIG. 1. The command component 213 can receive a host command (e.g., a command received from a host) 223 and/or a firmware command (e.g., firmware that can be executed to perform functions associated with a firmware command) 225 through a multiplexer ("mux") 224 and a logical to physical ("L2P") component 226. As an example, the host (e.g., host 120) can send a request, including host command 223, to perform a read operation on data stored in the memory 240. The host can send a request, including host command 223, to perform a write operation on data stored in the memory 240. As an example, the firmware can be executed to send a request, including firmware command 225, to refresh data stored in the memory 240. The firmware can be executed to send a request, including the firmware command 225, to perform an operation associated with a particular clock cycle on data stored in the memory 240. In the event that both the host command 223 and the firmware command 225 are received in tandem, the memory 240 may be accessed so close in time that an affect on the data stored in the memory may occur, altering a value stored in the data and/or creating errors in the data and in subsequent operations performed on the data.

The host can send or the firmware can be executed to send a request, including host command 223 or firmware command 225, to perform an operation on the data in memory 240 by sending the request through the mux 224. A simple round-robin priority may be performed if a command is received at the same time from the host and or through the firmware. The request stream of commands from one interface (e.g., host 120 or firmware) can be processed in a first-in-first-out (FIFO) order and also the requests from either of the interfaces can be processed as if a single stream in FIFO order in relation to each other. In some embodiments, a component can be between the mux 224 and an L2P component 226 and can split commands with multiple physical address locations identified into single commands identifying single physical address locations. The L2P component 226 maps logical address to physical addresses.

The sent request can be initially sent to a L2P component 226 in order to convert data associated with a logical address to be associated with a physical address. As an example, the host command 223 can be sent to the mux 224 and can be associated with a logical address in the memory 240 and the L2P component 226 can associate the data with a physical address. In one example, the address associated with execution of the firmware command 225 can already be a physical address. The firmware command 225 can be sent from the L2P component 226 to the command component 213 using a logical to physical conversion. In some embodiments, a split component (not illustrated) can be between the command component 213 and the memory 240. The split component can split commands that identify multiple channels and/or dies into single commands identifying a single channel and/or die. In this example, the command component 213 can send a command to execute to the split component first and the split component would then transfer the processed command to the memory 240 for execution.

As a command is received from either the host or through execution of the firmware at the command component 213, the command component 213 determines whether a physical address associated with the command is also associated with an already received command. An execution queue in the command component 213 can list entries that indicate all commands that have been received along with their corresponding physical addresses. Each of the entries in the execution queue can indicate whether the commands are active (indicating the commands have been sent to memory for execution) or pending (indicating that the commands are delayed or withheld from being sent to the memory until a response indicating that all previously received commands associated with the same physical address have been executed).

In order to avoid an overlap of access to the memory 240, the command component 213 can prevent access to data stored in a same physical address of memory 240 by one command as other commands may be used to already access that same physical address until the initial access has been completed. As an example, a command can be received at the command component 213 that is associated with a particular physical address. The particular physical address can be compared to the entries in the execution queue to determine whether that particular physical address is already in the execution queue and associated with a previously received command. An entry is generated in the execution queue for the received command and the entry is indicated as pending if there is an entry of a previously received command that is associated with the particular physical address. In the case of a pending command, a link is entered into the active command entry such that when the active command is executed, the link is accessed and directs the command component 213 to process the subsequently received command associated with the same physical address next.

Each entry in the execution queue includes a command identification (ID) that is used to identify a particular entry in the queue, the particular physical address that is associated with the received command, and a status of the entry (which in this example, would be pending). In one example, there may have been a previously received command but if the previously received command has been executed and cleared from the execution queue, the received command could be indicated as active and sent for execution. If the particular physical address does not match another physical address associated with the commands in the execution queue, the entry for the received command would be indicated as active and the command would be sent to the memory for execution.

In the event that a previously received command is active and yet to be executed, a pending command entry can be delayed or held until a response, illustrated as arrow 232, is received from the memory 240 indicating that the active command has been executed. Once the response 232 is received, the link in the active command entry (of the previously received command which has now been executed) can direct the command component 213 to process the received command next. Further, a response, illustrated as arrow 233, can be sent to a host or to additional firmware to be executed that verifies that a command has been executed. The active command entry (of the previously received command) can be cleared and the pending command entry (of the received command) can be updated to an active command entry. However, if there was an intermediate command sent subsequent to the previously received command but prior to the received command, the received command would be delayed until this intermediate command was executed. In this example, the previously received command entry would link to the intermediate command entry and the intermediate command entry would be linked to the received command entry. In this way, an order of commands that are associated with a same physical address can be tracked in order to avoid duplicate access of the physical address.

In some embodiments, as will be further described below in association with FIGS. 3-7, a response from the memory 240 can be sent, as indicated by arrow 234, to a delay component 281 (such as delay component 181 in FIG. 1) and be delayed a particular period of time. At completion (or expiration) of the particular period of time, the response can be sent, indicated by arrow 236, to the command component 213. In some embodiments, the response can be delayed at the delay component 281 when the command is a write command and the response can bypass the delay component 281 when the command is a read command. In some embodiments, a response associated with a write command can be delayed by the delay component 281 and a response associated with a read command can be sent to the delay component 281 but may not be delayed by the delay component 281.

In the event that a command is received that corresponds to a different physical address and does not correspond to another physical address in the execution queue, the command can be indicated as active and executed in the regular FIFO fashion (e.g., in the order of time it was received). In this way, commands are delayed in relation to other commands with a same physical address, but commands with different physical addresses are executed in the order of time they were received, absent the different physical address already being in the execution queue and associated with another command.

In some embodiments, a write blocking FIFO can be used for firmware write (FW) commands. The logic of the write blocking FIFO can insure that a write that is blocked (marked as pending because of a conflict with an active command) will also cause subsequent writes to be blocked in FIFO order behind it. This can align all FW write commands to be forwarded with the same order as the write data arriving from the host (e.g., host command 223) or as firmware (e.g., firmware command 225) because the FW data buffer may only provide FIFO accessing and not random accessing.

As an example, using the write blocking FIFO in this manner can keep all writes executed in the order in which they were received. In this example, FW writes can be executed in order because the write data arrives from firmware in the same order as the commands. So, if one of the FW writes is blocked due to a conflict with an earlier command, it is entered into the write blocking FIFO and becomes pending, and all subsequent write commands from firmware will also be entered in FIFO order into the write blocking FIFO, behind the first write command. Once the earlier command's active status is cleared from the command component, the first pending write in the write blocking FIFO will be released and loaded into the command component and become active. Any subsequent writes at the top of the write blocking FIFO will also be released (if it does not have a conflict in the command component), and will become active in the command component. This can continue, until the write blocking FIFO is empty or one of the writes hits a conflict in the command component. If a write command at the top of the write blocking FIFO happens to hit a conflict in the command component, it will not be released at that time, and all subsequent write commands behind it will also be held. This can keep the write commands in order. In some examples, write commands can be received from one input port (such as from the firmware) and be subject to entry into the write blocking FIFO, and all writes from a different input port (such as from the host) can bypass the write blocking FIFO and go directly into the command component. This can allow write commands from the host to be executed out of order and write commands from firmware be executed only in order.

Figure 3:
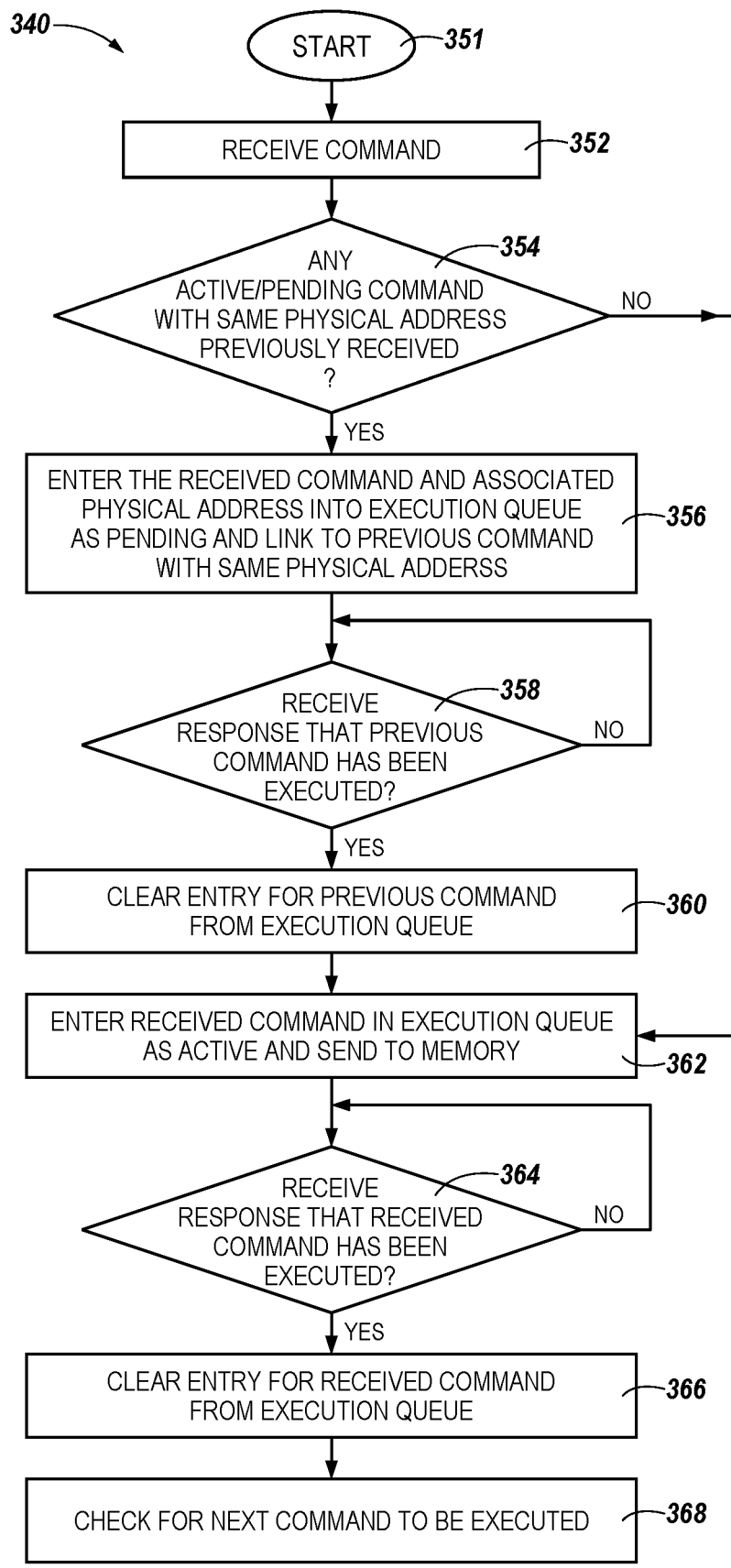
FIG. 3 is a flow diagram of an example method for using a command component in accordance with some embodiments of the present disclosure.

FIG. 3 is a flow diagram 340 of an example method for using a command component in accordance with some embodiments of the present disclosure. The method 340 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 340 is performed by the command component 113 of FIG. 1 and/or the command component of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 351, the method starts, and, at 352, a command is received. The command can be received at a command component (such as command component 113, 213 in FIGS. 1 and 2, respectively). At block 354, in response to receiving the command, the method 340 can include determining whether another active or pending command directed to or corresponding to targeting a same physical address has been previously received and is listed in an execution queue. In one example, the execution queue can include entry locations for the listing of 128 commands. As the commands are received, each command can be entered into the execution queue at one of these entry locations. Each of the entries in the execution can be identified by a corresponding command identification (ID) that indicates a particular command, used for locating that particular command in subsequent operations (such as clearing the command from the execution queue). The determination can include comparing the received command and associated physical address to each of the entries in the execution queue. At block 362, the method 340 can include, in response to no entries in the execution queue matching the received command (indicating no commands in the execution queue are associated with a same physical address as the received command), the received command and its associated physical address can be entered into the execution queue as active and sent to the memory for execution.

At block 356, the method 340 can include, in response to an entry in the execution queue matching the received command (indicating a previously received command is associated with a same physical address in the memory as the currently received command), the received command and its associated physical address is entered into the execution queue as pending and the received command is linked to the previous command that matched. In this way, a pending entry in the execution queue indicates that a command has been received but is being delayed until the previously received command (with a same physical address) has been executed. In some embodiments, the entries that are all associated with a same physical address can be ordered based on time of receival as well to maintain an order of the executions of commands (which will also be maintained based on the links between the commands with a same physical address).

At block 358, a determination is made regarding whether the previous command has been executed. If the previous command has been executed (indicated by a received response), the entry for the previous command is cleared from the execution queue, as shown at block 360. As will be described below in association with FIGS. 4A-4D, the response sent to the command component can be delayed. For example, a write command can be executed by the memory and the memory can send a response to the command component. However, the response can be delayed at a delay component between the memory and the command component. In this way, the response is delayed a particular period of time, delaying the clearing of the associated write command in the execution queue of the command component. The received command can be delayed and remain pending until a response is received from the memory indicating that the previously received command has been executed. The response from the memory can include the command ID associated with the entry so that the entry of the command that was executed can be located in the execution queue and cleared. At block 362, in response to clearing the previously received command entry, the received command entry can be entered as an active command and be sent to the memory for execution.

In response to none of the entries in the execution queue matching the received command (indicating previously received commands are associated with different physical addresses in the memory), as shown at block 362 of the method 340, the received command and its associated physical address is entered into the execution queue as active and the received command is sent to the memory for execution. The received command can also be flagged as an "oldest" entry in the execution queue to maintain an order in time of the commands.

At block 364, a determination whether a response is received from the memory indicating that the received command has been executed can be made. The received command can remain as an active entry in the execution queue until a response is received from the memory indicating that the received command has been executed. At 366, when the response indicating the received command has been executed is received, the entry in the execution queue corresponding to the previously received command can be cleared. At 368, in response to clearing the received command entry, the execution queue can be checked for a next command to be executed.

If, while the method of flowchart 340 described above is being performed, an additional command associated with the same physical address is received (subsequent to receiving the received command but prior to execution of the received command), the additional command would have been linked to the received command and indicated as pending. The checking of the execution queue for the next command would identify the link to the additional command and the additional command would be changed to an active command and sent to the memory for execution. However, if subsequent commands associated with different physical addresses are received while performing the method of flow chart 340, the check of the execution queue would identify the subsequent commands to be sent to the memory for execution in the order that the subsequent commands were received in time. For instance, if one of the subsequent commands were received subsequent to receiving the received command but prior to execution of the previously received command, the one of the subsequent commands would be sent to the memory for execution (since the received command would still be a pending command).

Figure 4A:
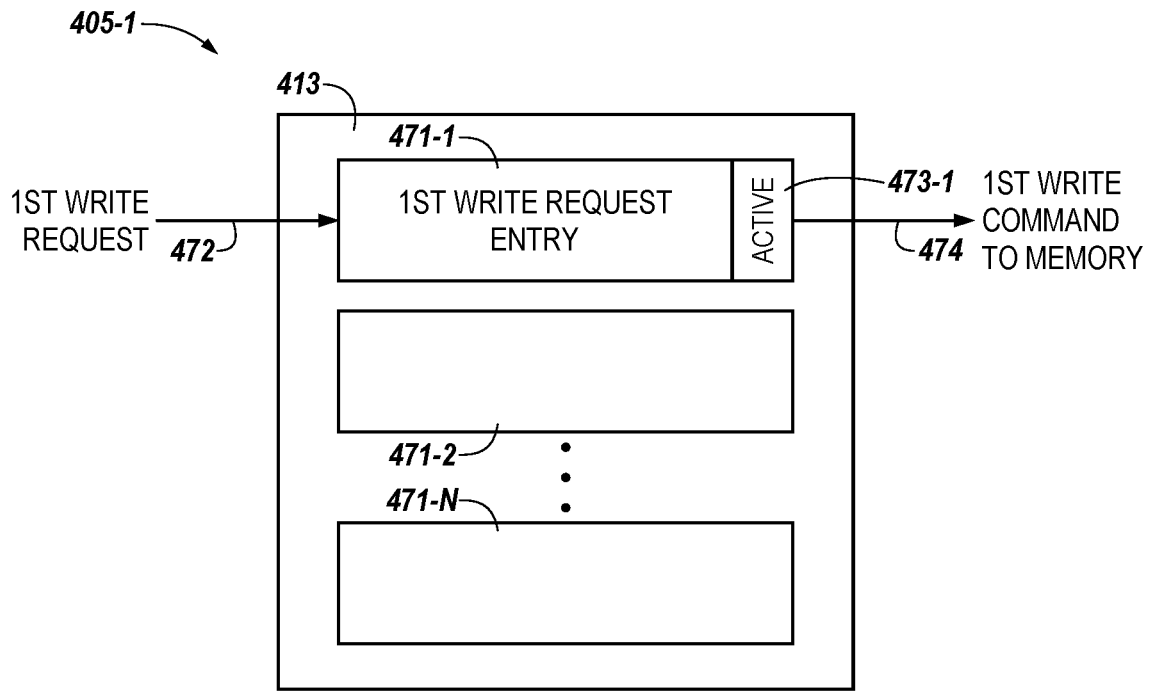
FIGS. 4A-D are each an example computing environment corresponding to a method for using a command component in accordance with some embodiments of the present disclosure.

FIGS. 4A-D are each an example computing environment corresponding to a method for using a command component in accordance with some embodiments of the present disclosure. FIG. 4A is an example computing environment 405-1 corresponding to a method for using the command component 413. The command component 413 can include multiple entries 471-1, 471-2, . . . , 471-N (hereinafter referred to collectively as entries 471). The entries 471 can be used to enter write requests (and therefore write or read commands) and their associated physical addresses along with a status indicator (such as status indicator 473-1 of a first entry 471-1). The command component 413 can be used as a content addressable memory (CAM) to determine whether a physical address of a received request matches a corresponding physical address of one of the entries 471 (referred to as a CAM "hit" when there is a match and a CAM "miss" when there is not a match).

The command component 413 can receive a $1^{st}$ write request, indicated by arrow 472, that includes is a first write command associated with a first physical address in memory. The $1^{st}$ write request can be entered into a first entry 471-1 of the command component. The first entry 471-1 can include a status portion 473-1 that indicates whether the first entry 471-1 is active or pending. Since this is the $1^{st}$ write request and there are no other active commands associated with the same physical address, the first entry 471-1 is indicated as "ACTIVE." In response to the $1^{st}$ write request being an active entry in the command component 413, the $1^{st}$ write request (e.g., $1^{st}$ write command) can be sent, as indicated by arrow 474, to the memory.

Figure 4B:
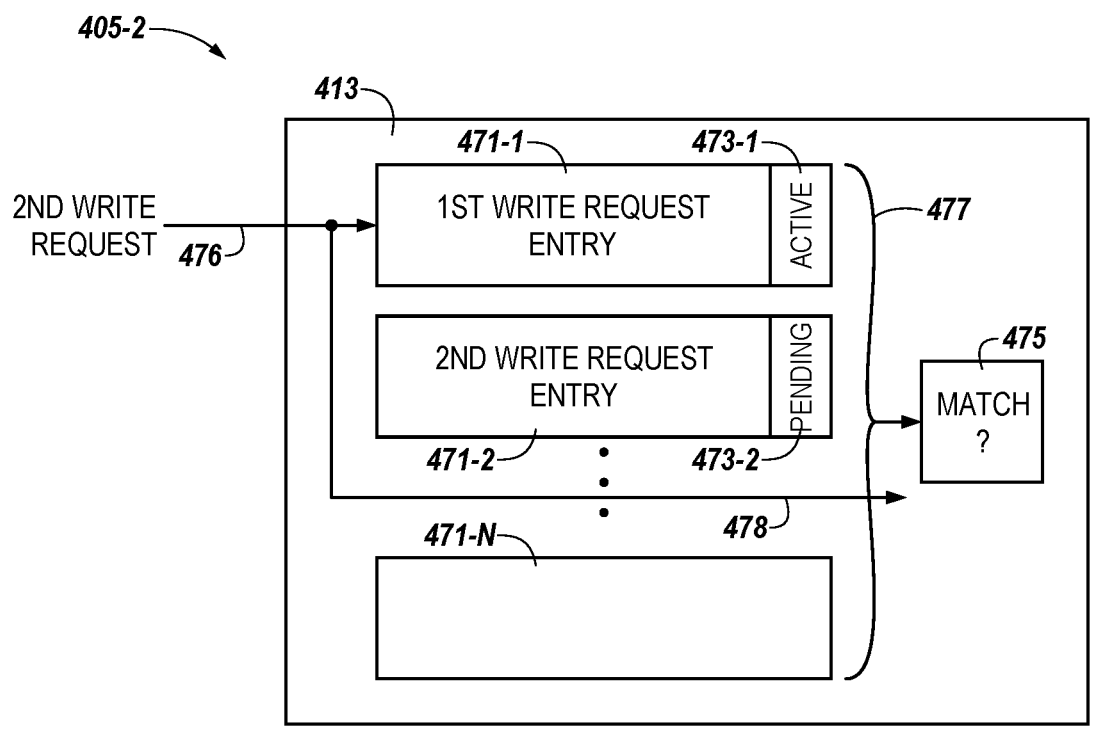

FIG. 4B is an example computing environment 405-2 corresponding to a method for using the command component 413. Subsequent to the $1^{st}$ write request being sent to the memory (as illustrated in FIG. 4A), a $2^{nd}$ write request can be sent, indicated by arrow 476, to the command component 413. The physical address of the $2^{nd}$ write request is compared to current entries in the command component 413 to the determine whether there is a match, as indicated by box 475, of the physical address associated with the received $2^{nd}$ write request and a physical address already stored as an entry in the command component 413, shown as arrow 477. In this example, the physical address associated with the $2^{nd}$ write request matches the physical address associated with the $1^{st}$ write request and therefore there is a match. Due to this match, the $2^{nd}$ write request is entered as the second entry 471-2 and its status indicator 473-2 is "PENDING."

Figure 4C:
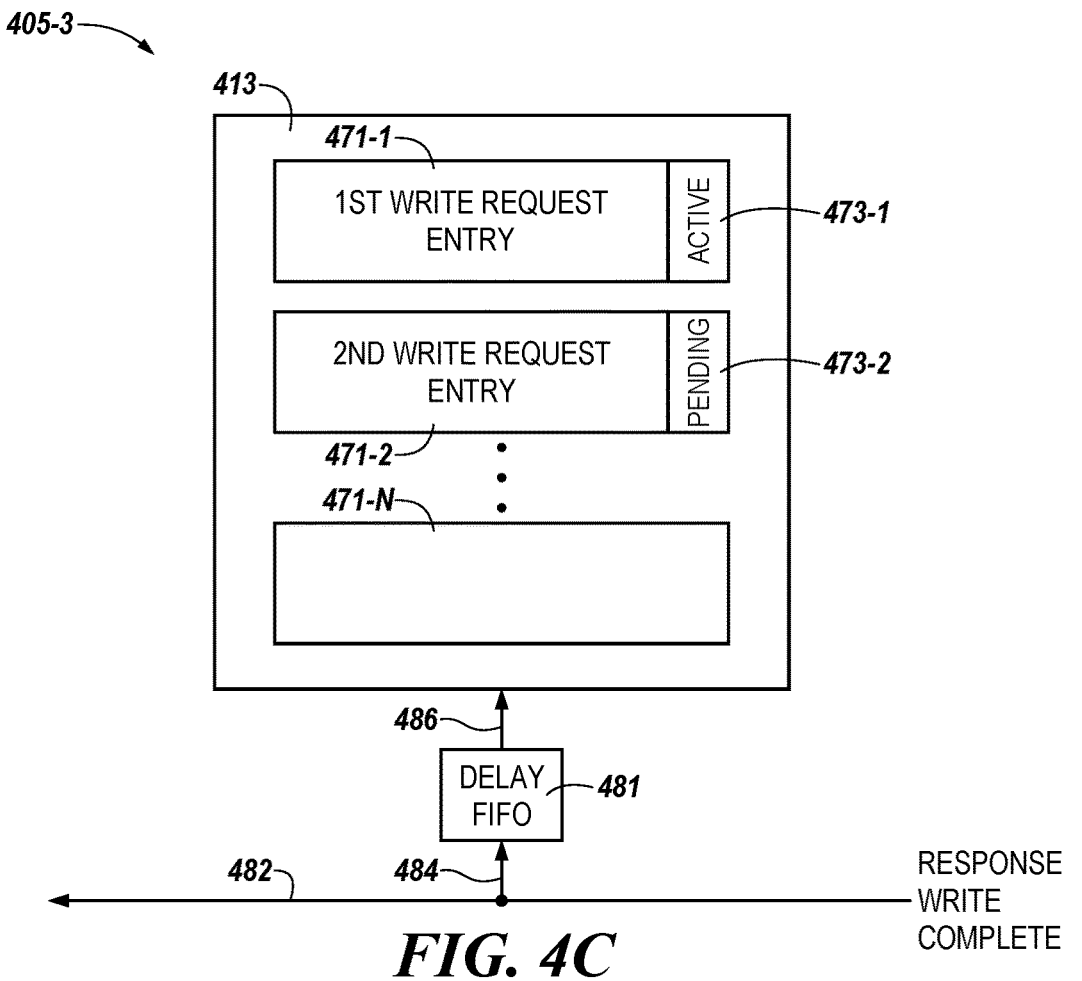

FIG. 4C is an example computing environment 405-3 corresponding to a method for using the command component 413. Subsequent to the $2^{nd}$ write request being entered into an execution queue of the command component 413 as a pending entry, a response indicating a write command has been completed ("Response Write Complete") can be sent to a host and/or firmware, as indicated by arrow 482, and also sent to a delay component (e.g., Delay FIFO) 481, as indicated by arrow 484. The response can be concurrently or simultaneously sent to the host/firmware and the delay component 481. The delay component 481 can delay the response a particular period of time and prevent the response from going to the command component 413 at the same time that a host/firmware may receive the response. The particular period of time can be between approximately 0-5 microseconds, between approximately 20-30 microseconds, approximately 25 microseconds, 2 microseconds, etc. As an example, particular memory cell technologies can be prone to errors if read or written to after a prior write operation within a particular period of time. For example, if a memory cell is written to within 0-5 microseconds of a prior write operation, an error may occur as the memory cell has not had sufficient time to equilibrate or reach the desired voltage to indicate a particular value.

In some embodiments, the delay component 481 can be an SRAM Delay FIFO that is a rotating FIFO that holds command IDs for write completes. The depth of the FIFO can determine the delay. Read and/or write pointers can increment periodically (such as at every clock cycle). As an example, a write pointer can follow a read pointer and, after the write command is executed, the read pointer can hit a same location after an entire depth of the SRAM FIFO is read through. For example, if an SRAM is 8,192 deep and a cycle is equal to 5 nanoseconds, the delay may be 40.9 microseconds (e.g., 8,129×5 ns-40.9 microseconds).

When a write complete response arrives at the delay FIFO, the write complete response can include a command ID (identifying the write command in the command component 413) that is entered into the SRAM Delay FIFO. When the command ID is sent out of the SRAM Delay FIFO, the command ID is used as a look-up into the command component 413 and cleared from the command component 413. The clearing of the active write command from the command component 413 can cause the command component 413 to go to the next write/read command in the execution queue either through a link of the cleared write command (if the write command has a same physical address as a next write command) or else to go to the next write command in the order it was received (if the next write command is associated with a different physical address.

Figure 5:
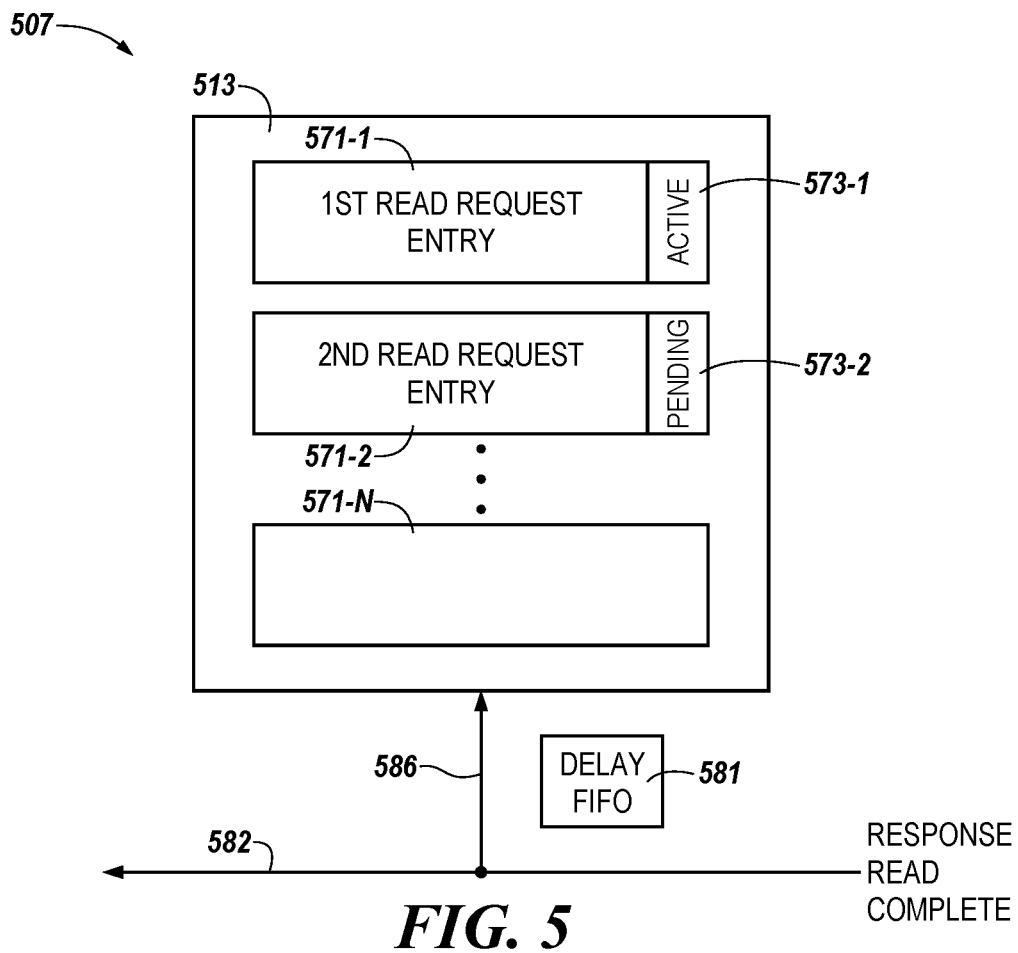
FIG. 5 is an example computing environment corresponding to a method for using a command component in accordance with some embodiments of the present disclosure.

In some embodiments, a response associated with a read command being executed may not be delayed in the delay component 481 or may bypass the delay component 481 and go directly to the command component 413 (as is illustrated and described in association with FIG. 5).

Figure 4D:
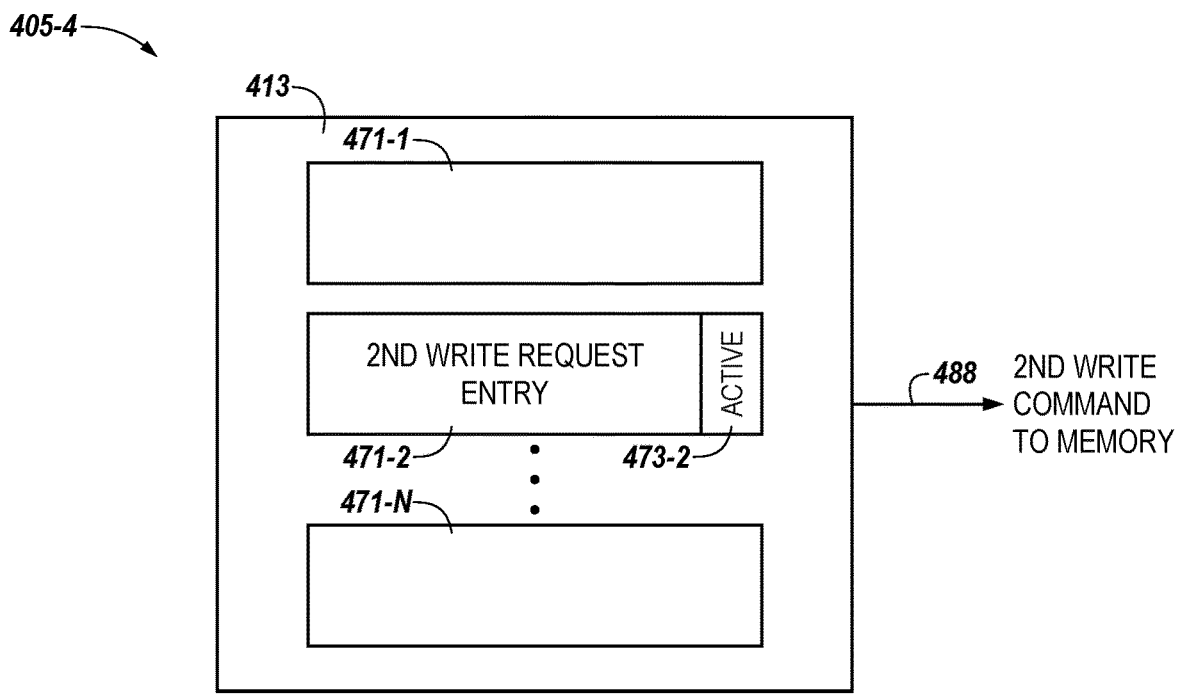

FIG. 4D is an example computing environment 405-4 corresponding to a method for using the command component 413. Subsequent to the response being sent to the command component 413 (via the delay component 481), the $1^{st}$ write request entry 471-1 can be cleared (as illustrated in FIG. 4D). The $2^{nd}$ write request entry 471-2 is the next write command with the same physical address and the status indicator 473-2 is changed to "ACTIVE." The "active" status allows the command component 413 to send the $2^{nd}$ write request (for the $2^{nd}$ write command) to the memory, as indicated by arrow 488. The $2^{nd}$ write command is executed in the memory and the method repeats (sending the response back to the host/firmware and the delay component 481, etc.).

FIG. 5 is an example computing environment 507 corresponding to a method for using a command component in accordance with some embodiments of the present disclosure. The example illustrated in FIG. 5 is associated with execution of a read command in the memory. As illustrated in FIG. 5, a response indicating a read command has been completed ("Response Read Complete"), indicated by arrow 582 to the host/firmware and 586 to the command component 513, is sent concurrently or simultaneously. The delay component 581 is illustrated as being bypassed and therefore the response is not delayed in this example.

Whether or not the delay of the response (indicating that execution of a command has occurred) is caused by a bypass of a delay component 581 or by the delay component 581 not delaying the response, the delay occurs after a write to write (W2 W) command and/or a write to read (W2R) command and does not occur after a read to write (R2 W) command or a read to read (R2R) command. An initial read operation is treated differently in these circumstances, for example, because the memory cells are less prone to errors if read or written immediately after reads as opposed to being read or written immediately after a write operation. The nature of the write operation can have a lagging effect on the cell (that does not occur after a read operation) and if the cell is accessed a subsequent time too close to the occurrence of the write operation, it can have a negative effect on the subsequent read or write operation performed on the cell.

Figure 6A:
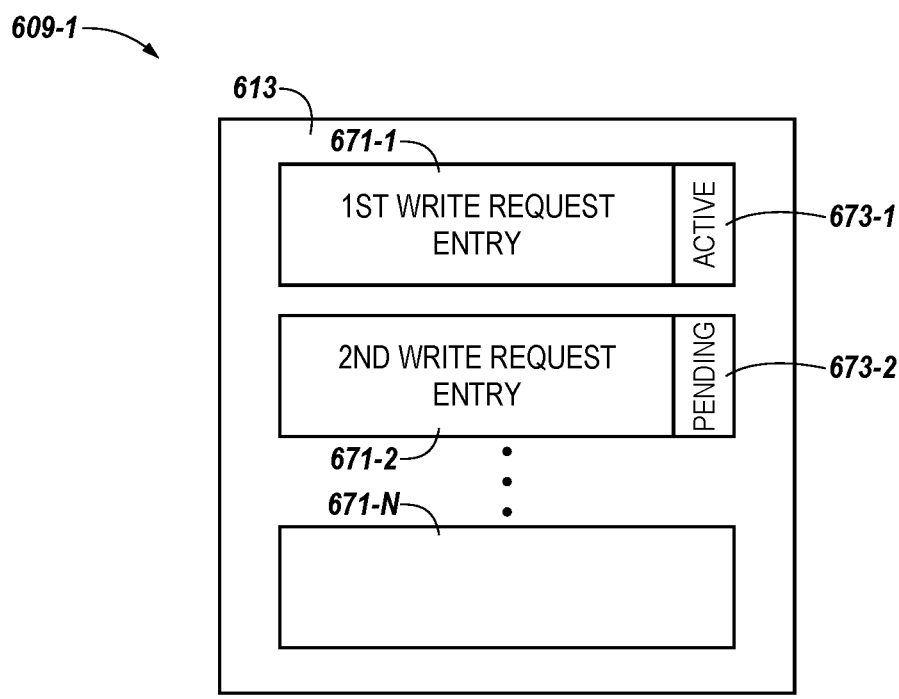
FIGS. 6A-6C are each an example computing environment corresponding to a method for using a command component in accordance with some embodiments of the present disclosure.
Figure 6B:
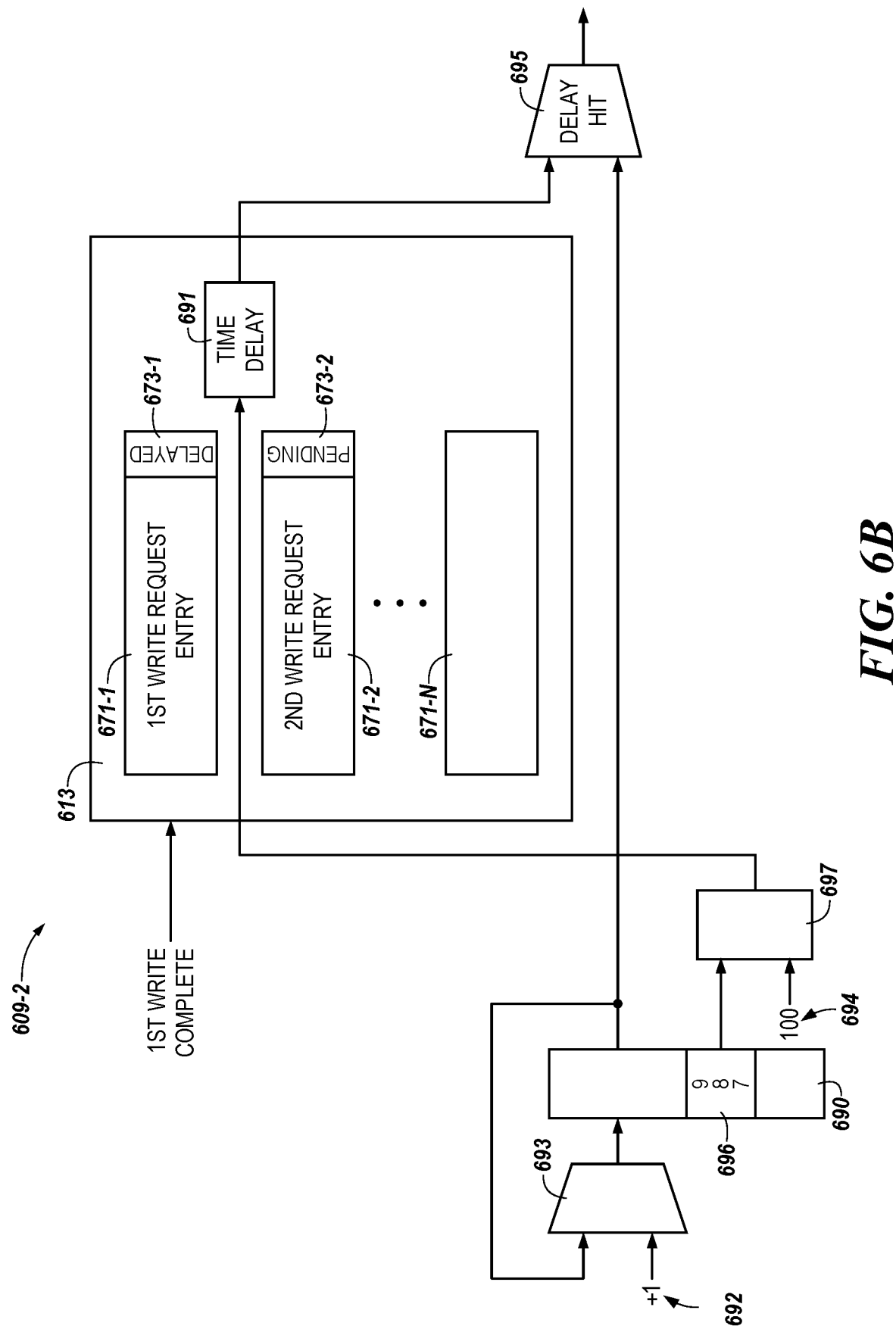
Figure 6C:
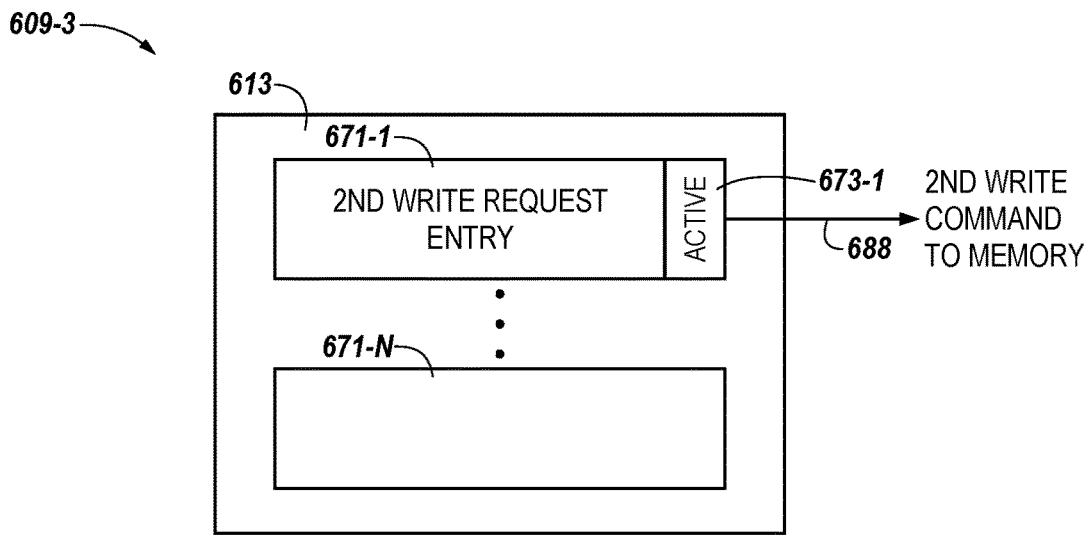

FIGS. 6A-6C are each an example computing environment corresponding to a method for using a command component in accordance with some embodiments of the present disclosure. The method associated with FIGS. 6A-6C includes using a counter rather than delay FIFO (as was described in FIGS. 4A-4D) to delay a response from the memory indicating execution of a command. FIG. 6A is an example of a computing environment 609-1. The computing environment 609-1 includes a command component 613.

The command component 613 can include multiple entries 671-1, 671-2, . . . , 671-N where commands are entered along with corresponding physical addresses and associated status indicators 673-1, 673-2, etc. As illustrated, a $1^{st}$ write request associated with a first write command can be received and entered in the command component 613 as a first entry 671-1. The first entry 671-1 can have a status indicator 673-1 as "ACTIVE" as, in this example, there has not been a previously received command with a same physical address. A subsequent $2^{nd}$ write request can be received and entered as a second entry 671-2. Since, in this example, this $2^{nd}$ write request is associated with a same physical address as the $1^{st}$ write request, the second entry is associated with a status indicator 673-2 of "PENDING" and will be pending until completion of the $1^{st}$ write request.

FIG. 6B an example computing environment 609-2 corresponding to a method for using a command component in accordance with some embodiments of the present disclosure. In this example, in response to receiving a "$1^{st}$ Write Complete" from the memory, a time counter 690 is used to determine whether a delay has expired and the write command can be cleared. The status indicator 673-1 is changed to "DELAYED" and several inputs are used to determine whether a delay hit has occurred in a delay device 695. This "DELAY" can be a third state along with the "ACTIVE" and "PENDING" statuses. A 3-bit time delay field 696 (using bits 9:7) is used for each entry. The value in the 3-bit time stamp 696 of the time counter 690 can be added to a constant value in adder 697 and then be stored into the time delay field 691 of the command component 613. In response to receiving the $1^{st}$ Write Complete response, the 3-bit time delay timestamp 696 from the time counter 690 is captured and added, and a one hundred (100)-bit time delay 694 is added to the 3-bit time stamp 696 at an adder 697. As an example, if a time counter 690 increments every 5 nanoseconds (for a core clock cycle), then a 7-bit can toggle every 0.64 microseconds. If bits 9:7 are captured as time stamp 696, and a 100-bit time delay 694 is added and saved in a time delay field 691. The saved time delay field 691 can be compared to the running time counter 690 and a compare hit (at delay hit 695) will occur at 1.92 microseconds at approximately 2.56 microseconds later. A "+1" input 692 can be input to mux 693 in order to increment the time counter 690 by +1 every cycle, which can keep relative "real time".

FIG. 6C is an example computing environment 609-3 corresponding to a method for using a command component in accordance with some embodiments of the present disclosure. Once the delay hit occurs, as illustrated and described in association with FIG. 6B, the $2^{nd}$ write request entry 671-1 can be changed to a status indicator 673-1 of "ACTIVE" and sent to the memory, as indicated by arrow 688.

Figure 7:
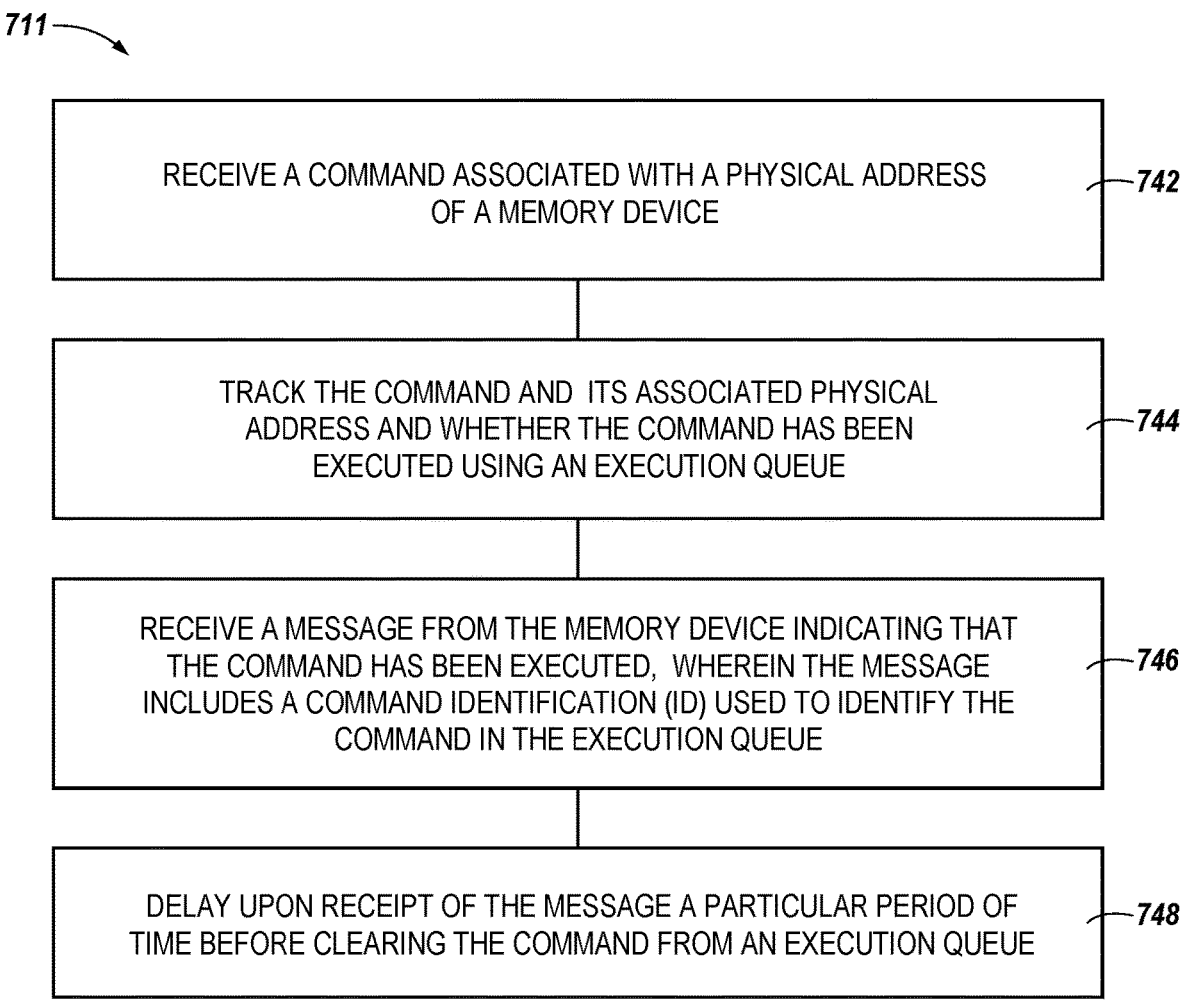
FIG. 7 is a flow diagram of an example method for command tracking in accordance with some embodiments of the present disclosure.

FIG. 7 is a flow diagram of an example method 711 corresponding to a command component in accordance with some embodiments of the present disclosure. The method 711 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 711 is performed by the command component 113 of FIG. 1, and/or the command component 213 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 742, the method 711 includes receiving (e.g., receiving at a command component) a command associated with a physical address of a memory device. The method 711 can further include determining whether a received additional command is associated with the physical address. In response to the received additional command being associated with the physical address, the method can include entering the received command into an execution queue and marking as pending. In response to the received additional command being associated with a different physical address than the physical address, the method can include entering the received additional command into the execution queue and sending the received additional command to the memory component to be executed. The method can include, in response to the additional command being marked as pending and in response to the command being cleared from the execution queue, changing the additional command from pending to active.

At operation 744, the method 711 includes tracking (e.g., tracking by the command component), the command and its associated physical address and whether the command has been executed using an execution queue.

At operation 746, the method 711 includes receiving (e.g., receiving at a delay component) a message from the memory device indicating that the command has been executed, wherein the message includes a command identification (ID) used to identify the command in the execution queue. The method 711 can further include receiving a command identification (ID) used to identify the command in the execution queue and the command ID is used to clear the command.

At operation 748, the method 711 includes delaying upon receipt of the message a particular period of time period clearing the command from an execution queue. The method 711 can further include sending the message, via the delay component, to the command component at expiration of the particular period of time. In some examples, the particular period of time can be different for an executed write command and an executed read command. In some examples, the particular period of time is longer for an executed write command than for an executed read command.

The method can further include clearing the command from the execution queue upon receipt of the message. The method can further include sending the message, via the memory component, to a host that sent the command prior to sending the message to the command component via the delay component. The method can further include sending the message, via the memory component, to a host that sent the command. The method can further include sending the message to the delay component concurrently to the host. The reception of the message can be delayed in the delay component en route to the command component. The method can further include sending the message, via the memory component, to a host that sent the command prior to clearing the command from the execution queue.

In some embodiments of the present disclosure, the method 711 further includes designating a received command as an active command in response to the received command being associated with a physical address that is not associated with another command. The method 711 further includes designating the received command as a pending command in response to the received command being associated with a physical address that is associated with an active command, wherein the active command is a command that has not been executed. The method 711 further includes, in response to designating the received command as the pending command, linking the active command with the pending command. The linking can direct the command component to execute the pending command in response to the active command being executed. The method 711 further includes, in response to the active command being executed, designating the pending command as a next active command and sending the next active command to the memory component to be executed.

Figure 8:
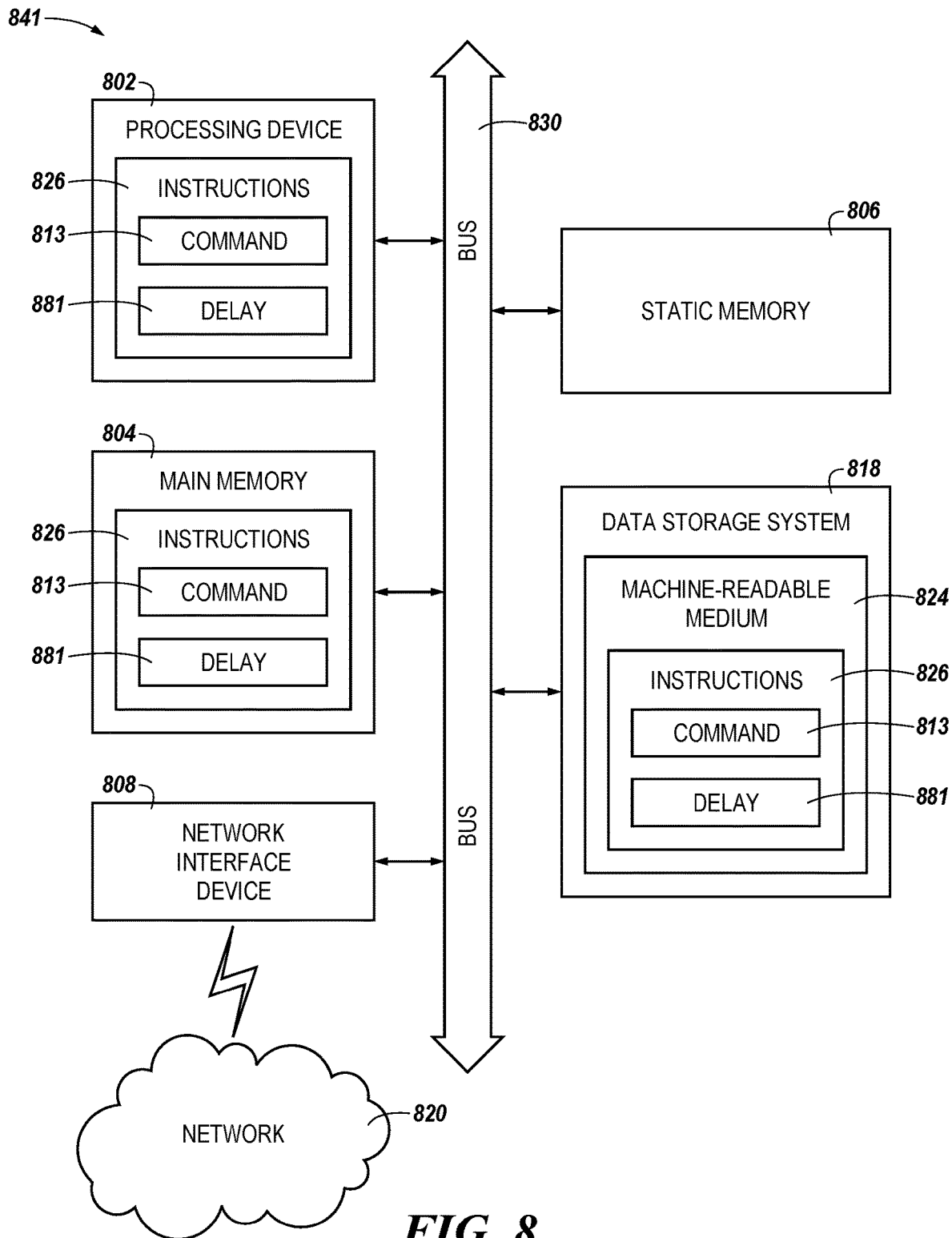
FIG. 8 is a block diagram of an example computer system in which embodiments of the present disclosure may operate.

FIG. 8 illustrates an example machine of a computer system 841 within which a set of instructions, for causing the machine to perform one or more of the methodologies discussed herein, can be executed. In some embodiments, the computer system 841 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the command component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or another machine capable of executing a set of instructions (sequential or otherwise) that specify actions to be taken by that machine. Further, while a single machine is illustrated, the term "machine" shall also be taken to include a collection of machines that individually or jointly execute a set (or multiple sets) of instructions to perform one or more of the methodologies discussed herein.

The example computer system 841 includes a processing device 802, a main memory 604 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

The processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 841 can further include a network interface device 808 to communicate over the network 820.

The data storage system 818 can include a machine-readable storage medium 824 (also known as a computer-readable medium) on which is stored one or more sets of instructions 826 or software embodying one or more of the methodologies or functions described herein. The instructions 826 can also reside, completely or at least partially, within the main memory 804 and/or within the processing device 802 during execution thereof by the computer system 841, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a compute component (e.g., the compute component 113 of FIG. 1). The instructions can include a command instruction 813 associated with performing operations with a command component (such as command component 113 in FIG. 1) and/or a delay instruction 881 associated with performing operations with a delay component (such as delay component 181, 281, 481, in FIGS. 12 and 4A-4D, respectively). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disk including floppy disks, optical disks, CD-ROMs, and magnetic-optical disks, read-only memories (ROMs), random access memories (RAMs), EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
a memory device;
a delay component; and
a command component coupled to the delay component, wherein the command component is configured to clear an active command from an execution queue in response to receiving a message from the memory device, via the delay component, indicating the active command has been executed;
wherein:
the active command is associated with accessing a physical address in the memory device; and
the delay component further comprises:
a write blocking first-in-first-out (FIFO) configured to:
receive a first firmware write (FW) command, and a second FW command;
block the received second FW command in a FIFO order behind the first FW command; and
in response to the clearing of the active command by the command component, loading the first FW command into the command component to allow an ordered execution of the first FW command and the second FW command; and
an input port configured to:
receive a host write command; and
cause the host write command to bypass the write blocking FIFO to allow an out of order execution of the host write command.

2. The apparatus of claim 1, wherein the command component is configured to enter the active command into the execution queue marked as active upon receipt of the active command.

3. The apparatus of claim 1, wherein the write blocking FIFO is a Static Random-Access Memory (SRAM) FIFO.

4. The apparatus of claim 1, wherein a delivery of the message from the delay component to the command component is delayed by a period of time between execution of a read command and receipt of the message indicating the read command was executed.

5. The apparatus of claim 1, wherein the command component is configured to enter the second FW command into the execution queue as pending.

6. The apparatus of claim 5, wherein the command component is configured to change the second FW command from pending to active in response to clearing the first FW command from the execution queue.

7. The apparatus of claim 1, wherein:
the command component is configured to enter the loaded first FW command into the execution queue as active command.

8. The apparatus of claim 1, wherein:
the command component is configured to enter a read command into the execution queue as active; and
the delay component is configured to not delay the message indicating the active write command has been executed.

9. The apparatus of claim 1, wherein the command component is a content-addressable memory (CAM) component.

10. An apparatus, comprising:
a memory device;
a delay component coupled to the memory device, the delay component further comprising:
a write blocking Static Random-Access Memory (SRAM) first-in-first-out (FIFO) configured to:
receive a first firmware write (FW) command, and a second FW command;
block the received second FW command in a FIFO order behind the first FW command; and
load the first FW command into a command component to allow an ordered execution of the first FW command and the second FW command; and an input port configured to:
  receive a host write command; and
  cause the host write command to bypass the write blocking FIFO to allow an out of order execution of the host write command; and
a command component coupled to the delay component, wherein the command component is configured to:
  clear an active command from an execution queue in response to receiving a message from the memory device, via the delay component, indicating the active command has been executed.

11. The apparatus of claim 10, wherein the delay component is further configured to cause:
  delaying a delivery of a message from the memory device by a particular period of time.

12. The apparatus of claim 10, wherein the command component is further configured to mark the loaded first FW command as an active command in response to a physical address associated with the loaded first FW command not being associated with another command in the command component.

13. The apparatus of claim 10, wherein the delay component is further configured to cause sending of a message to a host prior to sending the message to the command component.

14. A system, comprising:
a memory device;
a processing device coupled to the memory device to perform operations comprising:
  receiving a first firmware write (FW) command, and a second FW command;
  blocking the received second FW command in a first-in-first-out (FIFO) order behind the first FW command;
  clearing an active command from an execution queue in response to receiving a message from a memory device indicating the active command has been executed;
  in response to the clearing of the active command, loading the first FW command into a command component to allow an ordered execution of the first FW command and the second FW command;
  receiving a host write command; and
  causing the host write command to bypass the write blocking FIFO to allow an out of order execution of the host write command.

15. The system of claim 14, wherein the processing device is further configured to perform operations comprising sending of the message to a host and to a delay component concurrently.

16. The system of claim 15, wherein the processing device is further configured to performing operations comprising delaying the clearing of the active command from the execution queue by an amount of time approximately equal to a time period between when the host is sent the message and when the delay component sends the message to a command component.

17. The system of claim 14, wherein the processing device is further configured to perform operations comprising:
  determining whether the received first FW command is associated with a physical address associated with the active command; and
  in response to the received additional command being associated with the physical address, entering the received command into an execution queue and marking as pending.

18. The system of claim 17, wherein the processing device includes a write blocking Static Random-Access Memory (SRAM) first-in-first-out (FIFO) to allow the ordered execution of the first FW command and the second FW command.

* * * * *